July 4, 1933.   W. WALTHER   1,916,700
FLYWHEEL MAGNETO IGNITION APPARATUS
Filed Aug. 8, 1931
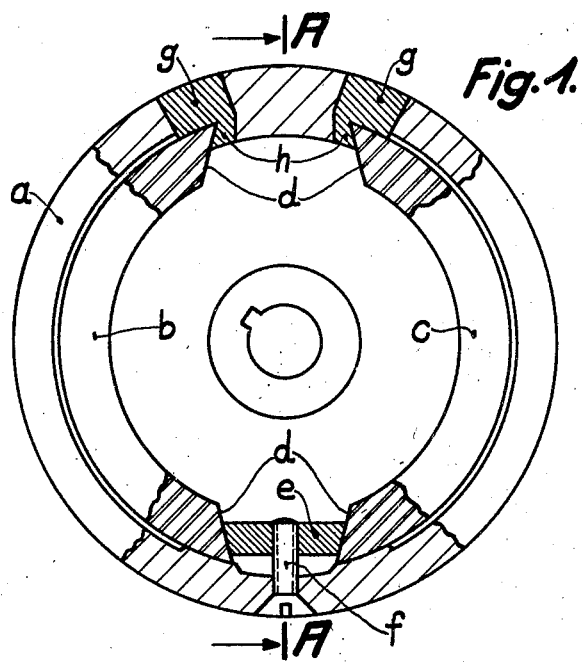
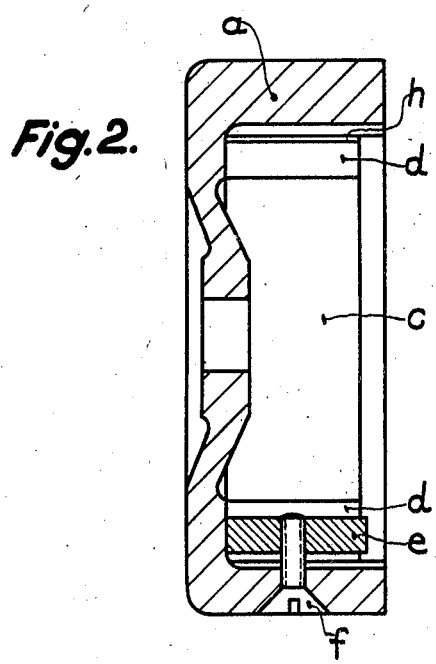
Inventor
Wilhelm Walther
by Steward + McKay
his attorneys Patented July 4, 1933

1,916,700

UNITED STATES PATENT OFFICE

WILHELM WALTHER, OF STUTTGART, GERMANY, ASSIGNOR TO ROBERT BOSCH AKTIENGESELLSCHAFT, OF STUTTGART, GERMANY

FLYWHEEL MAGNETO IGNITION APPARATUS

Application filed August 8, 1931, Serial No. 556,004, and in Germany September 1, 1930.

The present invention relates to flywheel magneto ignition apparatus of the type in which segmental magnets are secured in the flywheel casing by means of wedges and rotate past a stationary armature.

In known forms of construction two segmental magnets are pressed against the casing by two diametrically opposed wedges and against two pole-shoes cast in the casing. This construction has the disadvantage that it is precisely at that part of the casing which is already weakened by the cast-in pole-shoe a still further diminution of the cross-section takes place by screw holes for the wedge screws. As the peripheral speeds are fairly high and non-magnetic material, such as cast aluminium or brass of comparatively low strength must be used, it is very desirable that at the places where the pole shoes are cast in the cross-section of the casing should be weakened as little as possible. According to the present invention, this is attained by the cast-in pole shoes being provided with angular projections against which the segment-shaped magnets bear.

One example of construction of the present invention is shown in the accompanying drawing in which:—

Figure 1 shows a flywheel magnet partly in section.

Figure 2 a section on the line A—A of Figure 1.

The magnet casing $a$ formed as a flywheel is made of non-magnetic material. The magnet is formed by two segment-shaped parts $b$ and $c$. Each magnet part has bevelled surfaces $d$ at its ends, which when the magnet is put together are inclined towards one another in a direction towards the outside. At one end the magnets $c$, $b$, are pressed apart and against the rim of the flywheel by a wedge $e$ of magnetic material which bears against the bevelled surfaces. The wedge is drawn against the rim of the flywheel by means of a screw $f$. At the other end the magnet parts $c$, $b$ bear against pole shoes $g$ which are cast in the fly wheel. The pole shoes have inclined projections $h$ extending inwardly which exert a wedge action on the magnets and thereby produce a good bearing. The pole shoes are composed of stamped sheet metal. The magnets are so arranged that poles of opposite sign stand opposite each other. The wedge forms at the same time the magnetic connection between the two parts of the magnet.

I declare, that what I claim is:

1. A flywheel magneto device, comprising a magnet casing of circular form, a pair of opposed segmental-shaped magnets having bevelled ends, a displaceable wedge adapted to engage one end of each magnet, a pole piece cast in said casing at a point diametrically opposite said wedge and extending inwardly from said casing, said pole piece having a pole face on the outside of said casing and having a dove-tailed face on the inside of said casing for receiving the opposite end of one of said magnets.

2. A flywheel magneto device, comprising a circular magnet casing, a pair of opposed segmental-shaped magnets having bevelled ends, a magnetic wedge to engage one end of each magnet, screw threaded means extending through said casing adjustably holding said wedge against said bevelled edges, a pair of spaced pole pieces cast in said casing at a point diametrically opposite said wedge, each pole piece having a pole face on the outside of said casing and each extending inwardly from said casing, and dove-tailed faces on the inner end of each of said pole pieces engaged by the opposite ends of said magnets.

3. A flywheel magneto device, comprising a circular magnet casing, a pair of opposed segmental-shaped magnets having bevelled ends, a magnetic wedge engaging one end of each magnet, screw threaded means extending through said casing adjustably holding said wedge against said bevelled edges, a pair of laminated pole pieces cast in said casing at a point diametrically opposite said wedge, the outer ends of said pole pieces being flush with the outer periphery of said casing, and dove-tailed faces on the inner end of each of said pole shoes engaged by the opposite ends of said magnets, said magnets being arranged so that said pole pieces are of opposite polarity and said magnetic wedge connects magnet ends of opposite polarity.

In testimony whereof I have hereunto affixed my signature.

WILHELM WALTHER.